(12) United States Patent
Oh et al.

(10) Patent No.: US 9,255,034 B1
(45) Date of Patent: Feb. 9, 2016

(54) DIELECTRIC MATERIAL FOR TEMPERATURE COMPENSATION AND METHOD OF PREPARING THE SAME

(71) Applicants: Hyundai Motor Company, Seoul (KR); Dong Il Technology Ltd., Hwaseong, Gyeonggi-do (KR)

(72) Inventors: Sun Mi Oh, Gyeonggi-do (KR); Hyunsoo Sohn, Gyeonggi-do (KR); Young Min Kim, Gyeonggi-do (KR)

(73) Assignees: Hyundai Motor Company, Seoul (KR); Dong Il Technology Ltd, Hwaseong, Gyeonggi-Do (KR)

( * ) Notice: Subject to any disclaimer, the term of this patent is extended or adjusted under 35 U.S.C. 154(b) by 0 days.

(21) Appl. No.: 14/486,370

(22) Filed: Sep. 15, 2014

(51) Int. Cl.
*C04B 35/468* (2006.01)
*C04B 35/462* (2006.01)
*C04B 35/457* (2006.01)

(52) U.S. Cl.
CPC .............. *C04B 35/462* (2013.01); *C04B 35/457* (2013.01); *C04B 35/4682* (2013.01)

(58) Field of Classification Search
CPC .............. C04B 35/457; C04B 35/4682; H01L 41/1871
See application file for complete search history.

(56) References Cited

U.S. PATENT DOCUMENTS

| 3,660,124 A | 5/1972 | Yoshioka et al. |
| 4,388,416 A | 6/1983 | Sakabe et al. |
| 5,987,992 A | 11/1999 | Watanabe et al. |
| 6,251,816 B1 | 6/2001 | Maher et al. |
| 6,268,054 B1 | 7/2001 | Costantino et al. |

FOREIGN PATENT DOCUMENTS

| JP | H0828127 B2 | 3/1996 |
| KR | 10-0207900 B1 | 7/1999 |
| KR | 10-0646680 B1 | 11/2006 |

*Primary Examiner* — Karl Group
(74) *Attorney, Agent, or Firm* — Mintz Levin Cohn Ferris Glovsky and Popeo, P.C.; Peter F. Corless

(57) ABSTRACT

The present invention provides a dielectric material for temperature compensation of Chemical Formula 1 and a method of preparing the same.

$(Ba_{1-a-b-3c/2}Sr_aMg_bLa_c)(Ti_{1-x}Sn_x)O_3$  Chemical Formula 1

In the above Chemical Formula 1, a is $0 \leq a < 0.20$; b is $0 < b < 0.05$; c is $0 < c < 0.01$; and x is $0 < x < 0.20$ as defined in the detailed description.

5 Claims, No Drawings

DIELECTRIC MATERIAL FOR TEMPERATURE COMPENSATION AND METHOD OF PREPARING THE SAME

RELATED APPLICATIONS

This application claims priority to and the benefit of Korean Patent Application No. 10-2013-0152539 filed in the Korean Intellectual Property Office on Dec. 09, 2013, the entire contents of which are incorporated herein by reference.

TECHNICAL FIELD

The present invention relates to a dielectric material having a substantially high temperature coefficient and substantially high relative permittivity for temperature compensation without containing lead, and a method of preparing the same.

BACKGROUND

An LC tuned circuit that includes an inductor has been mainly used as a driving circuit in a piezoelectric ultrasonic wave sensor. However, electrostatic capacity change of the piezoelectric sensor based on a temperature needs to be compensated to maintain a driving waveform and driving efficiency in the LC tuned driving circuit, when the LC tuned driving circuit is used in a wide temperature range of about −40° C. to about 80° C., for example, in an ultrasonic wave sensor for a vehicle parking aid.

A temperature coefficient of capacitance (TCC) indicates a temperature compensation rate of an electrostatic capacity temperature compensation material to a reference temperature of 25° C. and is provided as follows:

$$TCC\ (ppm/°\ C.) = 10^6 \times (C_T - C_{25})/C_{25})/(T-25)$$

wherein, T indicates a temperature in Celsius (° C.), and each $C_T$ or $C_{25}$ indicates electrostatic capacity at each temperature of T or about 25° C.

A piezoelectric material used for the piezoelectric ultrasonic wave sensor typically includes a lead zirconium titanate (or PZT)-5-based soft piezoelectric material having a large piezoelectric constant and a small aging of frequency. However, the PZT-5-based soft piezoelectric material may have a substantially high TCC ranging from about 2,500 and about 4,000 ppm/° C. at a temperature of about −40 to about 25° C. and about 25 to about 80° C. and also, substantially high relative permittivity of about 2,000 or more.

A piezoelectric device for the ultrasonic wave sensor may be mostly adhered to a material such as aluminum, a polymer plastic, and the like, using an adherent such as epoxy and the like. Thus, such piezoelectric device may have much greater TCC due to change in hardness which depends on a temperature of the adherent. For example, the TCC depending on temperature characteristics of an adherent may be in a range of about 6,000 to about 10,000 ppm/° C. The piezoelectric device may be coupled in parallel with a temperature compensation device in the ultrasonic wave sensor. Accordingly, an electrostatic capacity compensation device may have a range of an electrostatic capacity that is appropriately selected by considering a compensation rate to minimize a transmitting wave-type vibration decrease characteristics and maintain reception sensitivity of the ultrasonic wave sensor. Therefore, the compensation device may have electrostatic capacity in a range of about 30% to about 70% of the electrostatic capacity of the piezoelectric device.

A temperature compensation device in an ultrasonic wave sensor for a vehicle has been developed continuously. In one example, such temperature compensation device may be internally built in a sensor structure and a wire may be directly soldered thereon. Since the ultrasonic wave sensor needs a driving voltage of about 400 to about 600 V/mm increasing electrostatic capacity by decreasing a thickness may be limited when relative permittivity is small with consideration to an insulation internal pressure, a separation distance of consecutive surfaces for insulation, and the like. In addition, when the electrostatic capacity is increased by decreasing the thickness, the temperature compensation device may have substantially low strength and become difficult to handle and further to manufacture into an integrated body with the ultrasonic wave sensor.

Accordingly, to down-size, and easily handle or manufacture the temperature compensation device or obtain an effective temperature compensation of the piezoelectric ultrasonic wave sensor in a wide range of temperature, the dielectric material having a temperature compensation rate of about −5,000 to about −30,000 ppm/° C. and relative permittivity of greater than or equal to about 1000 may be required.

Currently used dielectric materials for temperature compensation for a common circuit may include a calcium titanate ($CaTiO_3$)-zirconium titanate ($ZrTiO_3$)-strontium titanate ($SrTiO_3$) based material but has a temperature compensation rate of about −5,000 to about −6,000 ppm/° C. at maximum and relative permittivity of about 200 to about 800. In some examples, a barium titanate ($BaTiO_3$)-calcium zirconate ($CaZrO_3$)-zinc oxide (ZnO)- silicate ($SiO_3$) based material having a temperature coefficient of capacitance (TCC) of about −5,000 to about −15,000 ppm/° C. has been developed but relative permittivity thereof may be about 700 to about 1,100. In other example, a lead oxide ($Pb_3O_4$)-strontium oxide (SrO)- calcium oxide (CaO)-titanium oxide ($TiO_2$)-bismuth oxide ($Bi_2O_3$)-magnesium oxide (MgO) based material having a temperature coefficient of capacitance (TCC) of about −2,500 ppm/° C. and relative permittivity of less than or equal to about 500 has been developed. However, such materials may include toxic lead (Pb). In another example, a calcium titanate ($CaTiO_3$)-lead titanate ($PbTiO_3$)-lanthanum oxide ($La_2O_3$)-titanium oxide ($TiO_2$) based material having a temperature coefficient of capacitance of about −8,700 ppm/° C. has been reported, However, relative permittivity thereof may be less than or equal to about 1,000 and Pb may be included as well.

The above information disclosed in this section is merely for enhancement of understanding of the background of the invention and therefore it may contain information that does not form the prior art that is already known in this country to a person of ordinary skill in the art.

SUMMARY

One exemplary embodiment of the present invention provides a dielectric material for temperature compensation having a high dielectric constant and a high temperature compensation rate without containing lead; and further the dielectric material may optimize temperature compensation of a piezoelectric ultrasonic wave sensor in a wide temperature range thereby being capable of downsizing a temperature compensation device.

One exemplary embodiment of the present invention provides a dielectric material for temperature compensation of Chemical Formula 1.

  Chemical Formula 1

In the above Chemical Formula 1, a is 0≤a<0.20; b is 0<b<0.05; c is 0<c<0.01; and x is 0<x<0.20.

In another exemplary embodiment, the dielectric material for temperature compensation may have a negative (−) value of a temperature coefficient of capacitance (TCC) obtained from Equation 1 in both temperature range of about −40 to about 25° C. and about 25 to about 80° C. In addition, the temperature coefficient of capacitance may be of about −5,000 to about −30,000 ppm/° C.

Temperature coefficient of capacitance (TCC)
(ppm/° C.)=$10^6 \times (C_T-C_{25}/C_{25})/(T-25)$   Equation 1

In Equation 1, T indicates a temperature in Celsius (° C.), and each $C_T$ or $C_{25}$ indicates electrostatic capacity at each temperature of T or about 25° C.

In another exemplary embodiment, the dielectric material for temperature compensation may have relative permittivity ranging from about 1,000 to about 3,000 according to [Equation 2(at a reference temperature of 25° C.).

Relative permittivity (K)=$\epsilon/\epsilon_0$   Equation 2

In Equation 2, $\epsilon$ indicates a dielectric, constant of a dielectric material for temperature compensation, and $\epsilon_0$ indicates a dielectric constant of vacuum.

Another exemplary embodiment of the present invention provides a method of preparing a dielectric material for temperature compensation, which includes preparing a mixture including barium carbonate ($BaCO_3$), titanium dioxide ($TiO_2$), tin dioxide ($SnO_2$), lanthanum oxide ($La_2O_3$), and magnesium oxide (MgO), and optionally, strontium carbonate ($SrCO_3$) according to a composition ratio provided in Chemical Formula 1; and sintering the mixture at a temperature ranging from about 1280 to about 1360° C. for about 1 to about 3 hours.

The present invention provides the dielectric material for temperature compensation without containing lead but having a high dielectric constant and a high temperature compensation rate. Thus, the dielectric material of the present invention may optimize the temperature compensation of a piezoelectric ultrasonic wave sensor in a wide temperature range without using a restricted material, i.e., lead, further be capable of downsizing the temperature compensation device.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, embodiments are described in detail. However, these embodiments are exemplary, and this disclosure is not limited thereto.

In one exemplary embodiment of the present invention, a dielectric material for temperature compensation may be a material epresented by Chemical Formula 1.

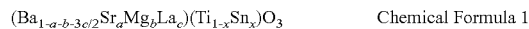   Chemical Formula 1

In the above Chemical Formula 1, a is 0≤a<0.20; b is 0<b <0.05; c is 0<c<0.01; and x is 0<x<0.20. An ultrasonic wave sensor for a vehicle is operated in a temperature range of about −40 to about 80° C. To compensate a temperature decrease to the substantially low temperature using a $BaTiO_3$-based material, a curie temperature (Tc) of the $BaTiO_3$ may be decreased to less than or equal to about −40° C. When the Tc is decreased using strontium (Sr), a room temperature dielectric constant may decrease. Therefore, in one exemplary embodiment of the present invention, the $BaTiO_3$-based material may be used along with tin (Sn) and lanthanum (La). Thus, the Tc may be decreased and a decrease effect of a dielectric constant may be reduced. Furthermore, toxic material such as lead (Pb) may not be used thereby providing environmentally-friendly dielectric materials for temperature compensation.

In another exemplary embodiment, the dielectric material for temperature compensation having the composition of Chemical Formula 1 may have a negative (−) value of temperature coefficient of capacitance in a temperature range of about −40 to about 25° C. and about 25 to about 80° C. In particular, the temperature coefficient of capacitance may be of about −5,000 to about −30,000 ppm/° C. When the dielectric material for temperature compensation has a temperature coefficient within the range, it may have excellent temperature compensation characteristics in a wide temperature range of about −40 to about 80° C. Accordingly, the dielectric material of the present invention may optimize a temperature compensation of a piezoelectric ultrasonic wave sensor and further be capable of downsizing the temperature compensation device.

In addition, the temperature coefficient of capacitance may be obtained according to Equation 1.

Temperature coefficient of capacitance
(TCC) (ppm/° C.)=$10^6 \times (C_T-C_{25}/C_{25})/(T-25)$   Equation 1

In Equation 1, T indicates a temperature (° C.), and each $C_T$ or $C_{25}$ indicates electrostatic capacity at each temperature of T or about 25° C.

In addition, the dielectric material for temperature compensation may have a relative permittivity ranging from about 1,000 to about 3,000 (at a reference temperature of 25° C.). When the dielectric material for temperature compensation has relative permittivity within the range, it may have improved temperature compensation characteristics in a wide temperature range of about −40 to about 80° C. Accordingly, the dielectric material of the present invention may optimize temperature compensation of a piezoelectric ultrasonic wave sensor and further be capable of downsizing the temperature compensation device.

Further, the relative permittivity may be obtained according to Equation 2 at a reference temperature of 25° C.

Relative permittivity (K)=$\epsilon/\epsilon_0$   Equation 2

In the Equation 2, ∈ indicates a dielectric constant of the dielectric material for temperature compensation, and $\epsilon_0$ indicates a dielectric constant of vacuum.

In the following Table 1, the compositions 7, 8, and 10 to 12 correspond to Examples according to exemplary embodiments of the present invention, while the compositions 1 to 6 and 9 correspond to Comparative Examples according to conventional materials. In addition, each a, b, c, or x in Table 1 respectively indicates a composition ratio corresponding to each content of Sr, Mg, La or Sn of Chemical Formula 1.

As shown in the following Table 2, the contents of Sn, Sr, Mg and La may be appropriately adjusted within a range according to an exemplary embodiment to have relative permittivity of about 1,500 to about 2,500 at room temperature of 25° C.; and a temperature coefficient of capacitance (TCC) of about −9,200 to about −30,000 ppm/° C. at a temperature of about −40 to about 25° C. The relative permittivity at room temperature and the temperature coefficient of capacitance may be adjusted by increasing or decreasing the content of Sn or Sr within a range according to an exemplary embodiment, if necessary. Accordingly, the dielectric material for temperature compensation according to an exemplary embodiment may includes no Pb but may have such a high dielectric constant and a high TCC of about −40 to about 80° C. that electrostatic capacity decrease of a piezoelectric sensor may he effectively compensated in a wide temperature range when compared to conventional dielectric materials.

As shown in Tables 1 and 2, when only Sr is used as in the compositions 1 and 2, Tc is not sufficiently low; but TCC is may be substantially high (e.g., above a threshold value) even though a is about 0.5 or about 0.6. However, when the content of Sr is increased as in the composition 2, the room temperature dielectric constant is may sharply deteriorate and may not be appropriate for the piezoelectric device compensation material. When only Sn is included as in the compositions 3 to 5, the compositions including only Sn have may have a substantially high TCC as or a sharply deteriorated dielectric constant likewise the composition including only Sr.

The addition of La may suppress particle growth during sintering and may prevent sharp deterioration of a dielectric constant in addition to lowering Tc. When La is added, the content of La, c, is greater than or equal to about 0.01; a sintering property may be sharply deteriorated thereby causing a substantially high dielectric loss. However, when a sintering temperature is increased, most of the La may be solidified into a particle and have minimal effect. Accordingly, the content of La may be in a range of 0<c<0.01 according to an exemplary embodiment of the present invention.

The addition of Mg may decrease Tc, increase a sintering property, and decrease TCC. When Mg is not included as in the composition 6, a sintering density may decrease, and a dielectric loss may increase. Accordingly, the content of Mg may be in a range of about 0<b<0.05 to prevent sharp deterioration of relative permittivity. The dielectric material for temperature compensation may be prepared according to the following method.

The mixture including $BaCO_3$, $TiO_2$, $SnO_2$, $La_2O_3$, and MgO, and optionally, $SrCO_3$ may be prepared according to the composition ratio range provided in Chemical Formula 1.

The obtained mixture may be dried and calcinated to prepare synthesized powder and then, molded and sintered. In partciular, the sintering may be performed at a temperature of about 1280 to about 1360° C. for about 1 to about 3 hours. Specifically, a dielectric material for temperature compensation provided in Table 1 may be prepared. A mixture including $BaCO_3$, $TiO_2$, $SnO_2$, $SrCO_3$, $La_2O_3$, and MgO may he uniformly prepared according to the composition ratio provided in Table 1 in an attrition mill by adding deionized water and a dispersing agent thereto. The mixture may be vacuum-filtered and dried at about 80 to about 120° C. The dispersing agent may include a non-ion-based dispersing agent and the like in a weight ratio of about 0.25%. The dried cake may be broken and calcinated at about 1,100° C. for about 2 hours to synthesize the raw materials. After breaking the calcinated cake, deionized water and the dispersing agent may be added thereto, and the mixture may be pulverized in the attrition mill, filtered and dried, preparing a synthesized powder. A polyvinylalcohol (PVA) solution of about 10 w/w % may be added to the synthesized powder.

The mixture may be spray-granulated into granules for molding, and the granules may be pressed and molded to have a size in diameter of about 12 mm and a thickness of about 1 mm. Then, the granuled mixture may be sintered at about 1,300° C. and about 1,340° C., respectively, for 2 hours to prepare a pellet. Both sides of the pellet may be printed with silver paste; the printed pellet be dried and heated at about 820° C. for about 15 minutes to put a silver electrode thereon; and characteristics of the electrode is measured. Electrostatic capacity and dielectric loss of the electrode are measured at 1 kHz and 1 V by using a LCR meter (Agilent, 4263B), and compensation rate of the dielectric material is measured at a temperature ranging from about −40 to about 80° C. in a thermostatic oven.

TABLE 1

| Composition Nos. | a | b | c | x | Note |
|---|---|---|---|---|---|
| 1 | 0.50 | 0 | 0 | 0 | Comparative Example 1 |
| 2 | 0.60 | 0 | 0 | 0 | Comparative Example 2 |
| 3 | 0 | 0 | 0 | 0.20 | Comparative Example 3 |
| 4 | 0 | 0 | 0 | 0.25 | Comparative Example 4 |
| 5 | 0 | 0 | 0 | 0.30 | Comparative Example 5 |
| 6 | 0.08 | 0 | 0.006 | 0.10 | Comparative Example 6 |
| 7 | 0.08 | 0.005 | 0.005 | 0.10 | Example 1 |
| 8 | 0.08 | 0.005 | 0.0075 | 0.10 | Example 2 |
| 9 | 0.08 | 0.005 | 0.01 | 0.10 | Comparative Example 7 |
| 10 | 0.08 | 0.005 | 0.0083 | 0.10 | Example 3 |
| 11 | 0.08 | 0.005 | 0.0065 | 0.125 | Example 4 |
| 12 | 0.08 | 0.005 | 0.0065 | 0.15 | Example 5 |

TABLE 2

| Composition | K 25° C. | tanδ 25° C. | TCC ppm/° C. (−25-80° C.) | TCC ppm/° C. (25-80° C.) | Sintering temperature (° C.) | Note |
|---|---|---|---|---|---|---|
| 1 | 1,500 | 0.002 | — | — | 1,300 | Comparative Example 1 |
| 2 | 850 | 0.003 | −60,000 | −3,600 | 1,300 | Comparative Example 2 |

TABLE 2-continued

| Composition | K 25° C. | tanδ 25° C. | TCC ppm/° C. (−25-80° C.) | TCC ppm/° C. (25-80° C.) | Sintering temperature (° C.) | Note |
|---|---|---|---|---|---|---|
| 3 | 3,000 | 0.002 | −61,000 | −7,000 | 1,300 | Comparative Example 3 |
| 4 | 1,400 | 0.003 | −45,000 | −7,300 | 1,300 | Comparative Example 4 |
| 5 | 850 | 0.004 | −16,000 | −7,000 | 1,300 | Comparative Example 5 |
| 6 | 1,100 | 0.25 | — | — | 1,300 | Comparative Example 6 |
| 7 | 1,700 | 0.003 | −19,000 | −8,500 | 1,300 | Example 1 |
| 8 | 2,400 | 0.001 | −30,000 | −8,200 | 1,300 | Example 2 |
| 9 | 1,160 | 0.155 | — | — | 1,300 | Comparative Example 7 |
| 10 | 1,500 | 0.004 | −19,000 | −8,500 | 1,300 | Example 3 |
| 11 | 1,500 | 0.004 | −9,200 | −6,360 | 1,300 | Example 4 |
| 12 | 2,300 | 0.003 | −30,000 | −10,000 | 1,300 | Example 5 |
| 7 | 2,250 | 0.005 | −21,500 | −9,100 | 1,340 | Example 6 |
| 8 | 2,250 | 0.004 | −28,000 | −10,000 | 1,340 | Example 7 |
| 10 | 1,700 | 0.006 | −15,000 | −7,300 | 1,340 | Example 8 |
| 11 | 1,630 | 0.005 | −11,500 | −6,400 | 1,340 | Example 9 |
| 12 | 1,500 | 0.005 | −20,000 | −8,200 | 1,340 | Example 10 |

Since Comparative Example 1 has a substantially high Tc of about −27° C., the TCCs may not be provided in Table 2. Furthermore, sicne Comparative Examples 6 and 7 show insufficient sintering properties, TCC thereof was not measured. In addition, the TCC values in Table 2 may be calculated according to Equation 1, and the K values may be calculated according to Equation 2.

Referring to Tables 1 and 2, each of Examples 1 to 10 using a dielectric material for temperature compensation according to one exemplary embodiment of the present invention shows the temperature coefficient of capacitance ranging from about −5,000 to about −30,000 ppm/° C. in both temperature ranges of about −40 to about 25° C. and about 25 to about 80° C. and relative permittivity of about 1,000 to about 3,000, in contrast to Comparative Examples 1 to 7. Accordingly, Examples 1 to 10 may optimize temperature compensation of a piezoelectric ultrasonic wave sensor in a wide temperature range and further be capable of downsizing the temperature compensation device.

In addition, when the sintering temperature is greater than about 1360° C., a new phase may be formed, and TCC increases. Meanwhile, when the sintering temperature is less than about 1280° C., sintering may not be sufficient and may cause high dielectric loss inappropriately.

While this disclosure has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A dielectric material for temperature compensation of Chemical Formula 1:

$$(Ba_{1-a-b-3c/2}Sr_aMg_bLa_c)(Ti_{1-x}Sn_x)O_3$$

where in, in Chemical Formula 1, a is $0 \leq a < 0.20$; b is $0 < b < 0.05$; c is $0 < c < 0.01$; and x is $0 < x < 0.20$.

2. The dielectric material for temperature compensation of claim 1, wherein the dielectric material has a negative (−) value of a temperature coefficient of capacitance (TCC) according to Equation 1 in both temperature ranges of about −40 to about 25° C. and about 25 to about 80° C.:

Temperature coefficient of capacitance (TCC) (ppm/° C.)=$10^6 \times (C_T-C_{25}/C_{25})/(T-25)$ wherein, in Equation 1, T indicates a temperature (° C.), and each $C_T$ or $C_{25}$ indicates electrostatic capacity at each temperature of T or 25° C.

3. The dielectric material for temperature compensation of claim 2, wherein the dielectric material has the temperature coefficient of capacitance (TCC) of about −5,000 to about −30,000 ppm/° C. according to Equation 1 in both temperature ranges of about −40 to about 25° C. and about 25 to about 80° C.

4. The dielectric material for temperature compensation of claim 1, wherein the dielectric material has a relative permittivity of about 1,000 to about 3,000 according to Equation 2 at a reference temperature of 25° C.:

Relative permittivity (K)=$\epsilon/\epsilon_0$ wherein, in Equation 2, $\epsilon$ indicates a dielectric constant of the dielectric material for temperature compensation, and $\epsilon_0$ indicates a dielectric constant of vacuum.

5. A method of manufacturing a dielectric material for temperature compensation, comprising:

preparing a mixture including barium carbonate ($BaCO_3$), titanium dioxide ($TiO_2$), tin dioxide ($SnO_2$), lanthanum oxide ($La_2O_3$), and magnesium oxide (MgO), and optionally, strontium carbonate ($SrCO_3$) in a composition ratio provided in Chemical Formula 1; and sintering the mixture at a temperature of about 1280 to about 1360° C. for about 1 to about 3 hours: where Chemical Formula 1 is $$(Ba_{1-a-b-3c/2}Sr_aMg_bLa_c)(Ti_{1-x}Sn_x)O_3$$

wherein, a $0 \leq a < 0.20$; b is $0 < b < 0.05$; c is $0 < c < 0.01$; and x is $0 < x < 0.20$.

* * * * *